(12) United States Patent
DeCesaris et al.

(10) Patent No.: US 9,742,585 B2
(45) Date of Patent: Aug. 22, 2017

(54) SIGNALING CONTROL AMONG MULTIPLE COMMUNICATION INTERFACES OF AN ELECTRONIC DEVICE BASED ON SIGNAL PRIORITY

(71) Applicant: Lenovo Enterprise Solutions (Singapore) Pte. Ltd., Singapore (SG)

(72) Inventors: Michael DeCesaris, Carrboro, NC (US); Luke D. Remis, Raleigh, NC (US); Gregory D. Sellman, Morrisville, NC (US); Christopher L. Wood, Greenville, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 349 days.

(21) Appl. No.: 14/549,138

(22) Filed: Nov. 20, 2014

(65) Prior Publication Data
US 2016/0149723 A1    May 26, 2016

(51) Int. Cl.
*G06F 13/00* (2006.01)
*H04L 12/28* (2006.01)
*H04L 12/40* (2006.01)

(52) U.S. Cl.
CPC .. *H04L 12/40143* (2013.01); *H04L 12/40013* (2013.01)

(58) Field of Classification Search
None
See application file for complete search history.

(56) References Cited

U.S. PATENT DOCUMENTS

| 3,886,524 A | * | 5/1975 | Appelt | G06F 13/37 |
| | | | | 710/110 |
| 5,144,161 A | | 9/1992 | Inaba | |
| 5,740,381 A | * | 4/1998 | Yen | G06F 13/364 |
| | | | | 710/113 |
| 5,952,846 A | | 9/1999 | Silver | |

(Continued)

FOREIGN PATENT DOCUMENTS

JP          04-014697          1/1992

OTHER PUBLICATIONS

Akl, Charbel J. et al., Transition Skew Coding: A Power and Area Efficient Encoding Technique for Global On-Chip Interconnects, The Center for Advanced Computer Studies (CACS), University of Louisian at Lafayette, Lafayette, LA, IEEE, 2007.

*Primary Examiner* — Hyun Nam
(74) *Attorney, Agent, or Firm* — Olive Law Group, PLLC (57) ABSTRACT

The present disclosure provides signaling control among multiple communication interfaces of an electronic device based on signal priority. According to an aspect, an electronic device includes multiple communication interfaces. The electronic device also includes a communication controller configured to determine priority of signals to be communicated on different communication interfaces among the plurality of communication interfaces. Further, the communication controller is configured to determine an order of communication of the signals among the different communication interfaces based on the priority of the signals to be communicated. The communication controller is also configured to control communication of the signals among the different communication interfaces based on the determined order of communication.

19 Claims, 3 Drawing Sheets

(56) References Cited

U.S. PATENT DOCUMENTS

| | | | |
|---|---|---|---|
| 5,956,288 A | 9/1999 | Bermingham et al. | |
| 5,959,466 A | 9/1999 | McGowan | |
| 7,043,670 B2 | 5/2006 | Alani et al. | |
| 7,398,333 B2 | 7/2008 | Hampel et al. | |
| 7,486,702 B1 | 2/2009 | Yang | |
| 7,523,238 B2 | 4/2009 | Messier | |
| 7,523,430 B1 | 4/2009 | Patel | |
| 8,412,497 B1 | 4/2013 | Alexander | |
| 2005/0256969 A1* | 11/2005 | Yancey | G06F 13/4256 709/238 |
| 2005/0271054 A1* | 12/2005 | Kang | H04L 47/24 370/389 |
| 2006/0259568 A1* | 11/2006 | Jagathesan | G06F 13/385 709/213 |
| 2010/0202475 A1* | 8/2010 | Nakazumi | H04L 12/433 370/475 |
| 2013/0094615 A1 | 4/2013 | Dimitriu et al. | |
| 2014/0143614 A1* | 5/2014 | Gollub | G06F 11/1004 714/48 |
| 2015/0324312 A1* | 11/2015 | Jacobson | G06F 13/4022 710/104 |

* cited by examiner

SIGNALING CONTROL AMONG MULTIPLE COMMUNICATION INTERFACES OF AN ELECTRONIC DEVICE BASED ON SIGNAL PRIORITY

TECHNICAL FIELD

The present disclosure relates to electronic device communication. More particularly, the present disclosure relates to signaling control among multiple communication interfaces of an electronic device based on signal priority.

BACKGROUND

Electronic circuit design has become very complex as processor clock speeds and logic density continue to increase. While the increase in speed and logic density provides for additional computational performance and functionality, the increase in speed and logic density also require higher input/output (I/O) pin counts to accommodate increased data throughput. Higher I/O pin counts for increased data throughput are used, as an example, in high-speed serial interfaces and memory interfaces. Such interfaces can require careful interface design. One limitation of having higher I/O pin counts, particularly for bi-directional data, is increased switching output noise due to multiple transistors enabling simultaneous switching. Such increased simultaneous switching output (SSO) noise can lead to erroneous detection of logic states of a signal, thus leading to signal errors.

One approach for addressing the increased SSO noise is to limit the number of output pins in a group of I/O pins. Alternatively, outputs in the group of I/O pins can be skewed such that only one or a few outputs are switching at the same time. However, skewing the outputs in higher speed circuits can limit data throughput and bus speed. In addition, such skewing the outputs may lead to system setup violations.

In view of the foregoing, there is a need for improved systems and techniques for managing output and input pins of an electronic devices.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure provides signaling control among multiple communication interfaces of an electronic device based on signal priority. According to an aspect, an electronic device includes multiple communication interfaces. The electronic device also includes a communication controller configured to determine priority of signals to be communicated on different communication interfaces among the plurality of communication interfaces. Further, the communication controller is configured to determine an order of communication of the signals among the different communication interfaces based on the priority of the signals to be communicated. The communication controller is also configured to control communication of the signals among the different communication interfaces based on the determined order of communication.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure. In another example, a computing device may be a server or other computer and communicatively connected to other computing devices (e.g., handheld devices or computers) for data analysis. In another example, a computing device may be a mobile computing device such as, for example, but not limited to, a smart phone, a cell phone, a pager, a personal digital assistant (PDA), a mobile computer with a smart phone client, or the like. A computing device can also include any type of conventional computer, for example, a laptop computer or a tablet computer.

As referred to herein, the term "electronic device" should be broadly construed. It can include any type of device including hardware, software, firmware, the like, and combinations thereof. An electronic device may include one or more processors and memory or other suitable non-transitory, computer readable storage medium having computer readable program code for implementing methods in accordance with embodiments of the present disclosure. In another example, an electronic device may be a reconfigurable processor or other computer architecture combining computer readable program code with flexible high speed computing fabrics such as field-programmable gate arrays (FPGAs). As an example, the electronic device, as a reconfigurable processor, may adapt the processor functionality during runtime by modifying the reconfigurable fabric with a new circuit via computer readable program code. In another example, electronic devices may have large resources of logic gates and RAM blocks to implement complex digital computations. The designs of the electronic devices may employ fast I/Os and bidirectional data buses where verifying correct timing of valid data within a determined setup and hold time becomes desirable. In another example, an electronic device may have a reconfigurable architecture wherein the underlying hardware architecture or device may alter the functionalities of its components and the interconnection between the components. The electronic device may be used in a system or a terminal for operating one or more communication modes.

As referred to herein, the term "communication interface" should be broadly construed. It can include any type of device including hardware, software, firmware, the like and combinations thereof. A communication interface may be a bus or a communication path used for carrying data between components of hardware, firmware, the like and combinations thereof. As an example, a communication interface may be a pin or set of pins providing electronic communication between the components of an electronic device or a computing device as defined herein. The communication interface may include the enabling circuitry such as the output drivers, timing and clock signals for driving the signals on the communication interface. The communication interface may also include reference signals and sampling circuitry for enabling the receiving of signaling on the communication interface.

Figure 1:
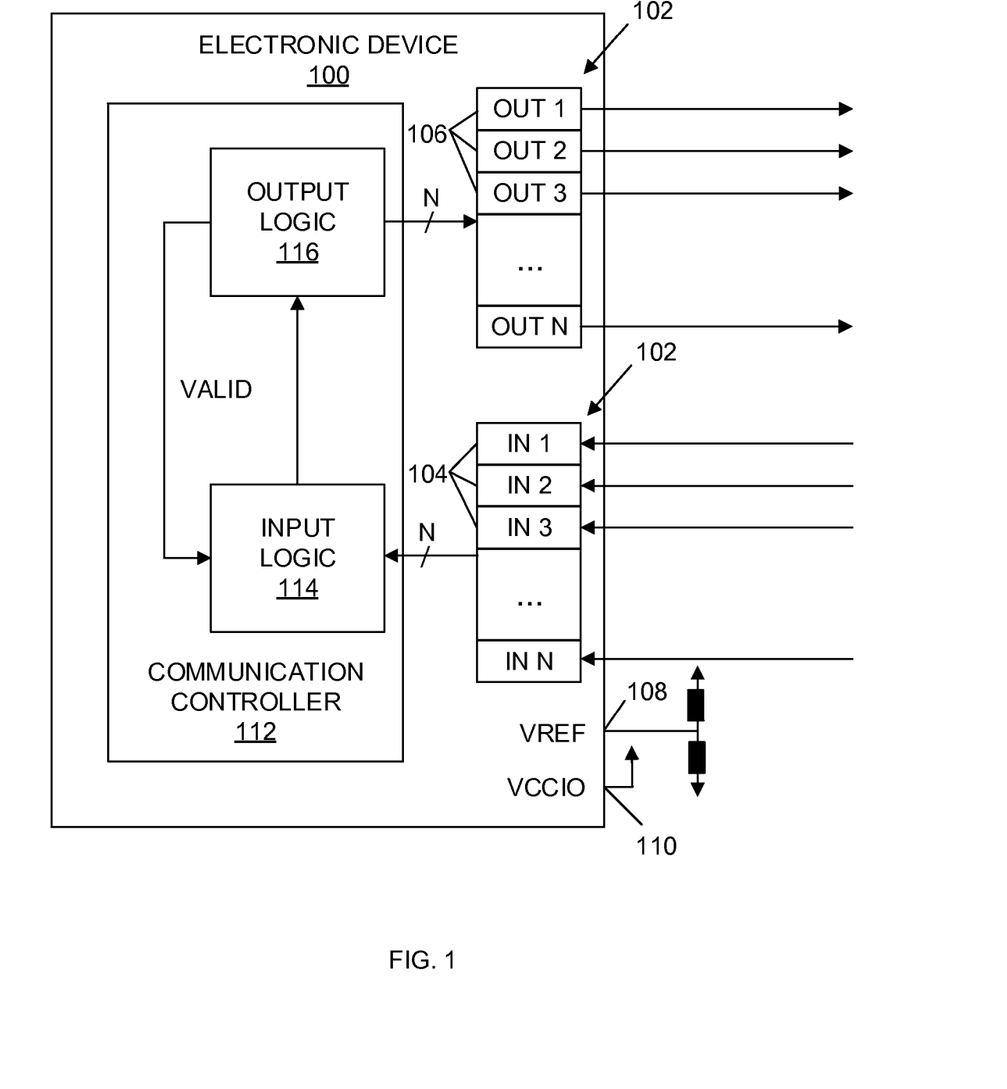
FIG. 1 is a block diagram of an example electronic device configured for signaling control among its multiple communication interfaces based on signal priority according to embodiments of the present disclosure.

The present disclosure is now described in more detail. For example, FIG. 1 illustrates a block diagram of an example electronic device 100 configured for signaling control among its multiple communication interfaces, generally designated 102, based on signal priority according to embodiments of the present disclosure. In this example, the electronic device 100 is an FPGA, although it should be understood that the electronic device 100 may be any other suitable electronic device having multiple communication interfaces. Referring to FIG. 1, the communication interfaces 102 include both input interfaces 104 (IN 1, IN 2, IN 3 . . . IN N) and output interfaces 106 (OUT 1, OUT 2, OUT 3 . . . OUT N). It should be understood that the electronic device 100 may include any number of input interfaces 104 and output interfaces 106. In this example, the input interfaces 104 are I/O pins configured and controlled for receiving input signals from another device. Also, in this example, the output interfaces 106 are I/O pins or pads configured and controlled for communicating (or transmitting) output signals from the electronic device 100 to another device.

The input interfaces 104 and output interfaces 106 may include any suitable hardware and/or components for receiving and communicating signals. The input interfaces 104 and output interfaces 106 may be general purpose input/output (GPIOs) that are banks of common GPIOs grouped to a voltage reference (VREF) pin 108 and a VCCIO pin 110 for power supply. GPIOs may be defined by an end user and may change dynamically during run time. The input signals may be compared to the voltage on the VREF pin 108. The logic state of an input signal may be incorrectly detected if there is noise at the VREF pin 108. The input logic 114 and the output logic 116 may be communicatively connected via communication paths 118 and 120.

The electronic device 100 includes a communication controller 112 configured to manage and control signaling among the input interfaces 104 and the output interfaces 106. In this example, pins of the input interfaces 104 and the output interfaces 106 are electrically connected to the communication controller 112. More particularly, the communication controller 112 may include input logic 114 and output logic 116 that are electrically connected to the input interfaces 104 and the output interfaces 106, respectively. The input logic 114 and output logic 116 may include hardware, software, firmware, or combinations thereof for managing and controlling signaling in accordance with embodiment of the present disclosure. The input logic 114 may be configured to sample signals on input buffers. The output logic 116 may be configured to enable chip output drivers for communicating signals.

Figure 2:
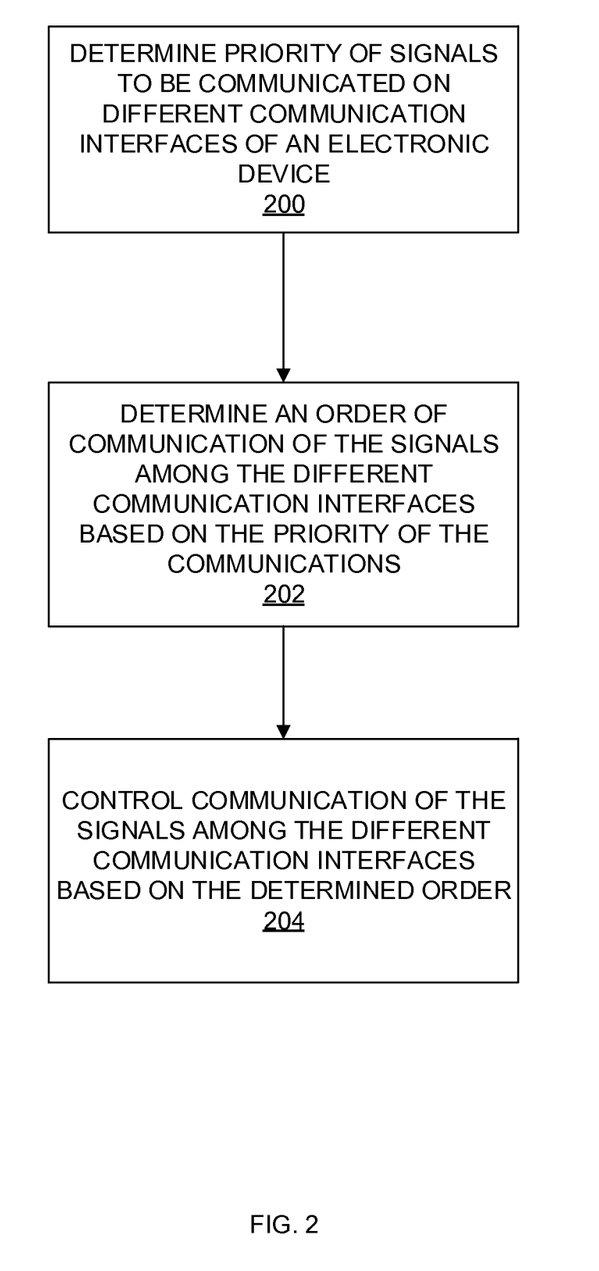
FIG. 2 is a flowchart of an example method of signaling control among multiple communication interfaces of an electronic device based on signal priority according to embodiments of the present disclosure.

In accordance with embodiments of the present disclosure, the communications controller 112 may control receipt of signals and communication of signals at the interfaces 104 and 106 based on priority of signals and/or other criteria disclosed herein. For example, FIG. 2 illustrates a flowchart of an example method of signaling control among multiple communication interfaces of an electronic device based on signal priority according to embodiments of the present disclosure. FIG. 2 is described by example with reference to the electronic device 100 shown in FIG. 1, although it should be understood that the method may alternatively be implemented by any other suitable device.

Referring to FIG. 2, the method includes determining 200 priority of signals to be communicated on different communication interfaces of an electronic device. For example, the communication controller 112 shown in FIG. 1 may determine that several signals are to be communicated on different communication interfaces 102. In an example, the communication controller 112 may determine that a signal is to be received is based on an edge or clock cycle on the input interface. In another example, the communication controller 112 may determine that a signal is to be received, because data is expected from another electronic device (e.g., data is sent to the other device and a response is being awaited. In another example, the communication controller 112 may be aware other actions in the system that may likely trigger input data (e.g., a failure occurred and will require a read of the controller. In another example, output logic 116 may determine that one or more signals are to be communicated (or transmitted) via one or more of the output interfaces 106. In another example, the input logic 114 may determine that one or more signals are to be received via one or more of the input interfaces 104. The communication controller 112 may determine priorities of the signals relative to one another. The priority information about the signals may be used for controlling the interfaces 102 for prioritizing receipt and communication of signals such that the system runs optimally or near optimally.

In an example of obtaining priority, the communication controller 112 may access a priority table in memory. The priority table may identify the electronic device's most valuable input interfaces and output interfaces. More particularly for example, each input interface and output interface may be assigned a score for indicating its priority. The communication controller 112 may determine that a signal is to be received or communicated on a particular interface, and subsequently perform a lookup in the table to access a priority score or other information for the interface. The priority table may be adjusted during run time.

Signal priority may be determined or established by any suitable technique. For example, signals may be prioritized based on one or more of the following: bandwidth (e.g., higher bandwidth can result in higher priority); importance (e.g., a bus carrying important data may be prioritized higher than others; and e.g., an air bag deployment circuit may have higher priority than a right blinker circuit); and edge rate (e.g., a device having fast edge rate is known to cause more disruptive noise in a system, so they may be prioritized as lower buses to not impact other ongoing transactions).

The method of FIG. 2 includes determining 202 an order of communication of the signals among the different communication interfaces based on the priority of the communications. Continuing the aforementioned example, the communication controller 112 may use priority information about signals to be received or to be communicated for determining an ordering for receipt of signals and/or the communication of signals. For example, if two or more interfaces 102 are competing at any particular time, the priority score for the interfaces may be used for a priority scheme. Higher priority signals or interfaces may be given preference for communication or receipt over lower priority signals or interfaces.

The method of FIG. 2 includes controlling 204 communication of the signals among the different communication interfaces based on the determined order. Continuing the aforementioned example, the communication controller 112 may control communication of signals on communication interfaces 102. For example, the communication controller 112 may determine priority of signals to be received by two or more input interfaces 102. The priority of the signals may be different. The communication controller 112 may determine that the priority of the signal associated with input interface IN 1 is greater than the priority of the signal associated with input interface IN 2. In this example scenario, the communication controller 112 may control receipt of the signal on input interface IN 1 to occur prior to receipt of the signal on input interface IN 2. In an example, the input logic 114 may control an order of communication by idling an input interface (e.g., input interface IN 2) while signaling occurs on the input interface of higher priority (e.g., input interface IN 1). In another example, the input interface may be idled for a predetermined time period needed for signaling to complete on the other input interface. The predetermined time period may be based on the priority list. In an example, time assignments can be made to each device to limit the amount of continuous time an input or output can operate. For example, a priority 1 input may be constantly accessing the controller and may have higher priority than any other bus. The priority 1 input may only be allowed full priority for 2 seconds.

In another example of controlling interfaces, the communication controller 112 may determine priority of signals to be communicated by two or more output interfaces 104. The priority of the signals may be different. The communication controller 112 may determine that the priority of the signal associated with output interface OUT 1 is greater than the priority of the signal associated with output interface OUT 2. In this example scenario, the communication controller 112 may control communication of the signal on output interface OUT 1 to occur prior to communication of the signal on output interface OUT 2. In an example, the output logic 116 may control an order of communication by idling an input interface (e.g., input interface IN 2) while signaling occurs on the input interface of higher priority (e.g., input interface IN 1). In another example, the input interface may be idled for a predetermined time period needed for signaling to complete on the other input interface. The predetermined time period may be based on the priority list. Once signaling is completed on the interface having the higher priority, the idled interface may be set to a normal mode of operation.

Figure 3:
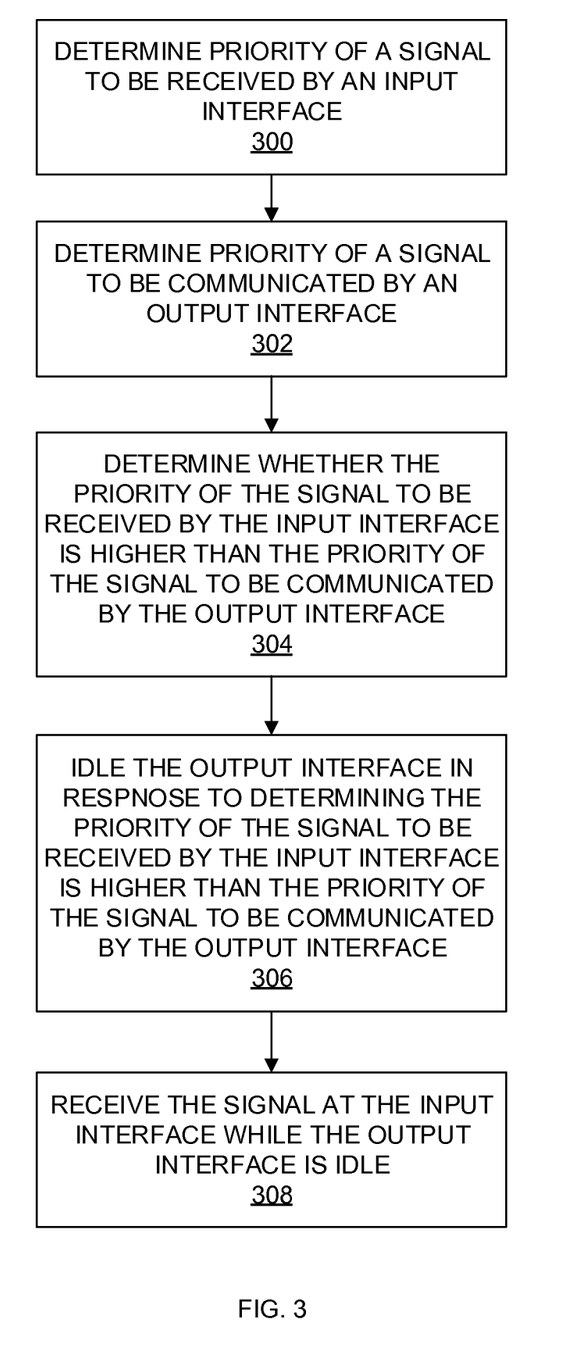
FIG. 3 is a flowchart of another example method of signaling control among multiple communication interfaces of an electronic device based on signal priority according to embodiments of the present disclosure.

In accordance with embodiments of the present disclosure, FIG. 3 illustrates a flowchart of another example method of signaling control among multiple communication interfaces of an electronic device based on signal priority. FIG. 3 is described by example with reference to the electronic device 100 shown in FIG. 1, although it should be understood that the method may alternatively be implemented by any other suitable device.

Referring to FIG. 3, the method includes determining 300 priority of a signal to be received by an input interface. For example, the communication controller 112 may access a prioritization table to determine a priority score of a particular input interface that the signal is to be received on. For example, the signal may be known to be incoming on one of the input interfaces 104.

The method of FIG. 3 includes determining 302 priority of a signal to be communicated by an output interface. Continuing the aforementioned example, the communication controller 112 may access the prioritization table to determine a priority score of a particular output interface for use in communicating the signal. For example, the signal may be known to be outgoing on one of the output interfaces 106.

The method of FIG. 3 includes determining 304 whether the priority of the signal to be received by the input interface is higher than the priority of the signal to be communicated by the output interface. Continuing the aforementioned example, the communication controller 112 may compare the priority scores of the signals. Further, the communication controller 112 may determine whether the priority of the signal to be received by the input interface is higher than the priority of the signal to be communicated by the output interface.

The method of FIG. 3 includes idling 306 the output interface in response to determining that the priority of the signal to be received by the input interface is higher than the priority of the signal to be communicated by the output interface. Continuing the aforementioned example, the communication controller 112 may idle the output interface in response to determining that the priority of the signal to be received by the input interface is higher than the priority of the signal to be communicated by the output interface.

The method of FIG. 3 includes receiving 308 the signal at the input interface while the output interface is idled. Continuing the aforementioned example, the signal may be received at the input interface while the output interface is idled. Subsequently, the method of FIG. 3 includes setting 310 the output interface to normal operation. For example, the idled output interface may be returned to normal operation.

In accordance with embodiments of the present disclosure, a communication controller of an electronic device may have access to priority information about each output interface and can choose or determine to idle one or more of the output interfaces based on incoming signaling. For example, the output logic 116 may be configured to determine the priority of one or more of the output interfaces 106. Further, the output logic 116 may be operable with the input logic 114 to determine that one or more of the input interfaces should sample one or more signals. The output logic 116 may also determine the priority of the one or more of the input interfaces of the signal(s) to be sampled. One or more of the output interfaces 106 may be idled in response to determining that the priority of the input interface(s) of the signal(s) to be sampled is greater than the priority of the output interface(s) 106. During idling of the input interface(s), the signal(s) may be received at the input interface(s). Further, for example, the output interfaces may be idled or delayed by the output logic 116 for a predetermined time period.

In accordance with embodiments of the present disclosure, a communication controller may store or otherwise have access to information about output interfaces for use in determining whether to delay receipt of incoming signals. For example, the input logic 114 shown in FIG. 1 may be configured to determine the number of output interfaces 106 that are switching or plan to be switching. The input logic 114 may receive this information from the output logic 116. The input logic 114 may determine whether the number exceeds a predetermined threshold number. In response to determining that the number exceeds the predetermined threshold number, the input logic 114 may delay an input signal or sample on one or more of the input interfaces 104 and/or instruct the output logic 116 to idle a bus transaction. The delay of the input signal may be a predetermined timer period. In another example, the input signal delay may be based on priority information.

In accordance with embodiments of the present disclosure, the communication controller 112 may be configured to throttle or control one or more output interfaces such that the input logic 114 can latch a signal without SSO noise associated with it. A prioritization table as described herein may identify the most valuable input interfaces and output interfaces based on the associated scores. If an input interface and an output interface are competing at any time, the communication controller 112 may hold the lower scoring interfaces.

In accordance with embodiments of the present disclosure, the communication controller 112 may launch data into the output logic 116 for latching. Subsequently, the communication controller 112 may scan for the number of output interfaces being driven and their location. The communication controller 112 may also determine that one or more input interfaces have higher priority than one or more output interfaces and receives the data on the input interface(s). Once the input data is latched, the output interfaces may be controlled to return to normal operation.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. An electronic device comprising:
   a plurality of communication interfaces, each communication interface of the plurality of communication interfaces assigned a priority for controlling communications on each communication interface of the plurality of communication interfaces; and
   a communication controller that:
      determines priority of signals to be communicated on different communication interfaces among the plurality of communication interfaces based on the assigned priority of each communication interface of the plurality of communication interfaces;
      determines an order of communication of the signals among the different communication interfaces based on the priority of the signals to be communicated; and
      controls communication of the signals among the different communication interfaces based on the determined order of communication.

2. The electronic device of claim 1, wherein the communication interfaces are each one of an input interface and an output interface.

3. The electronic device of claim 1, wherein the communication interfaces are each one of an input interface and an output interface of a field programmable gate array (FPGA).

4. The electronic device of claim 1, wherein the communication interfaces comprise a first input interface and a second input interface, and
   wherein the communication controller is configured to:
      determine a priority of a first signal to be received by the first input interface based on the assigned priority of the first input interface;
      determine a priority of a second signal to be received by the second input interface based on the assigned priority of the second input interface, wherein the priority of the first signal is higher than the priority of the second signal;
      determine whether the first signal has a higher priority than the second signal; and
      control receipt of the first signal by the first input interface prior to receipt of the second signal on the second input interface in response to determining that the first signal has a higher priority than the second signal.

5. The electronic device of claim 4, wherein the communication controller is configured to idle the second input interface in response to determining that the first signal has a higher priority than the second signal.

6. The electronic device of claim 4, wherein the communication controller is configured to idle the second input interface for a predetermined time period in response to determining that the first signal has a higher priority than the second signal.

7. The electronic device of claim 4, wherein the communication controller is configured to idle the second input interface based on a priority list in response to determining that the first signal has a higher priority than the second signal.

8. The electronic device of claim 1, wherein the communication interfaces comprise a first output interface and a second output interface, and
   wherein the communication controller is configured to:
      determine a priority of a first signal to be communicated by the first input interface based on the assigned priority of the first input interface;
      determine a priority of a second signal to be communicated by the second input interface based on the assigned priority of the second input interface, wherein the priority of the first signal is higher than the priority of the second signal;
      determine whether the first signal has a higher priority than the second signal; and
      control communication of the first signal by the first output interface prior to communication of the second signal by the second output interface in response to determining that the first signal has a higher priority than the second signal.

9. The electronic device of claim 8, wherein the communication controller is configured to idle the second output interface in response to determining that the first signal has a higher priority than the second signal.

10. The electronic device of claim 8, wherein the communication controller is configured to idle the second output interface for a predetermined time period in response to determining that the first signal has a higher priority than the second signal.

11. The electronic device of claim 8, wherein the communication controller is configured to idle the second output interface based on a priority list that identifies the priorities of the first output module and the second output interface.

12. The electronic device of claim 8, wherein the communication controller is configured to idle one of the communication interfaces based on a level of simultaneous switching output noise.

13. The electronic device of claim 1, wherein the communication interfaces comprise an input interface and an output interface, and
wherein the communication controller is configured to:
determine priority of a signal to be received by the input interface based on the assigned priority of the input interface; and
idle the output interface based on the priority of the signal.

14. A method comprising:
assigning a priority for each communication interface of a plurality of communication interfaces for controlling communications on each communication interface;
determining priority of signals to be communicated on different communication interfaces among the plurality of communication interface of an electronic device utilizing the assigned priority of each communication interface of the plurality of communication interfaces;
determining an order of communication of the signals among the different communication interfaces based on the priority of the communications; and
controlling communication of the signals among the different communication interfaces based on the determined order.

15. The method of claim 14, wherein the communication interfaces are each one of an input interface and an output interface of a field programmable gate array (FPGA).

16. The method of claim 14, wherein the communication interfaces comprise a first input interface and a second input interface, and
wherein the method further comprises:
determining a priority of a first signal to be received by the first input interface based on the assigned priority of the first input interface;
determining a priority of a second signal to be received by the second input interface based on the assigned priority of the second input interface, wherein the priority of the first signal is higher than the priority of the second signal;
determining whether the first signal has a higher priority than the second signal; and
in response to determining that the first signal has a higher priority than the second signal, controlling receipt of the first signal by the first input interface prior to receipt of the second signal on the second input interface.

17. The method of claim 14, wherein the communication interfaces comprise a first output interface and a second output interface, and
wherein the method further comprises:
determining a priority of a first signal to be communicated by the first input interface based on the assigned priority of the first input interface;
determining a priority of a second signal to be communicated by the second input interface based on the assigned priority of the second input interface, wherein the priority of the first signal is higher than the priority of the second signal;
determining whether the first signal has a higher priority than the second signal; and
controlling communication of the first signal by the first output interface prior to communication of the second signal by the second output interface in response to determining that the first signal has a higher priority than the second signal.

18. The method of claim 17, further comprising idling the second output interface in response to determining that the first signal has a higher priority than the second signal.

19. The method of claim 17, wherein the communication interfaces comprise an input interface and an output interface, and
wherein the method further comprises:
determining priority of a signal to be received by the input interface based on the assigned priority of the input interface; and
idling the output interface based on the priority of the signal.

* * * * *